United States Patent
Peng

(10) Patent No.: US 8,976,842 B1
(45) Date of Patent: Mar. 10, 2015

(54) PN CODE SYNC DETECTION AND CARRIER FREQUENCY OFFSET ESTIMATION FOR THE DIRECT SEQUENCE SPREAD SPECTRUM RECEIVER

(71) Applicant: Comtech EF Data Corp., Tempe, AZ (US)

(72) Inventor: Lianfeng Peng, Gilbert, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 6 days.

(21) Appl. No.: 13/865,394

(22) Filed: Apr. 18, 2013

Related U.S. Application Data

(60) Provisional application No. 61/721,951, filed on Nov. 2, 2012.

(51) Int. Cl.
H04B 1/00 (2006.01)
H04B 1/7073 (2011.01)
H04B 1/709 (2011.01)

(52) U.S. Cl.
CPC .............. *H04B 1/7073* (2013.01); *H04B 1/709* (2013.01)
USPC ........... 375/146; 375/135; 375/136; 375/137; 375/141; 375/142; 375/147; 375/149; 375/150

(58) Field of Classification Search
None
See application file for complete search history.

(56) References Cited

U.S. PATENT DOCUMENTS

| 5,963,586 | A * | 10/1999 | Durrant et al. ................. 375/142 |
| 6,005,889 | A * | 12/1999 | Chung et al. .................. 375/140 |
| 7,555,085 | B1 * | 6/2009 | Risk et al. ...................... 375/354 |
| 2014/0099079 | A1 * | 4/2014 | Narayanan et al. ........... 386/263 |

OTHER PUBLICATIONS

Erik Strom, Tony Ottosson, Arne Svensson, An Introduction to Spread Spectrum Systems, Department of Signals and Systems, Chalmers University of Technology, Sweden 2002.
Maxim Integrated Products, An Introduction to Direct-Sequence Spread-Spectrum Communications, Feb. 18, 2003.
Meel, Ir. J., Spread Spectrum (SS) applications, De Nayer Instituut, Studiedag Spread Spectrum, Oct. 6, 1999.
Meel, Ir. J., Spread Spectrum (SS) introduction, De Nayer Instituut, Studiedag Spread Spectrum, Oct. 6, 1999.

* cited by examiner

*Primary Examiner* — Adolf DSouza
(74) *Attorney, Agent, or Firm* — Booth Udall Fuller

(57) ABSTRACT

A method of detecting PN code synchronization for a DSSS signal comprising receiving a DSSS data signal of data frames comprised of I and Q symbols, at least a portion of each data frame comprising a unique word, demodulating the data signal into I and Q chip samples, filtering the I and Q chip samples and outputting the filtered I and Q chip samples to a chip stream controller which outputs the plurality of chip streams to a correlation matrix that correlates the plurality of chip streams with the chipped unique word and outputs a correlated data stream. A plurality of FFTs is run on the correlated output data stream and a processor searches for a maximum frequency bin power of each FFT. A PN synchronization detector searches for a maximum frequency bin power of each FFT. A PN synchronization detector searches for a maximum frequency bin power among the plurality of FFT rounds and determines whether PN synchronization is present.

20 Claims, 16 Drawing Sheets

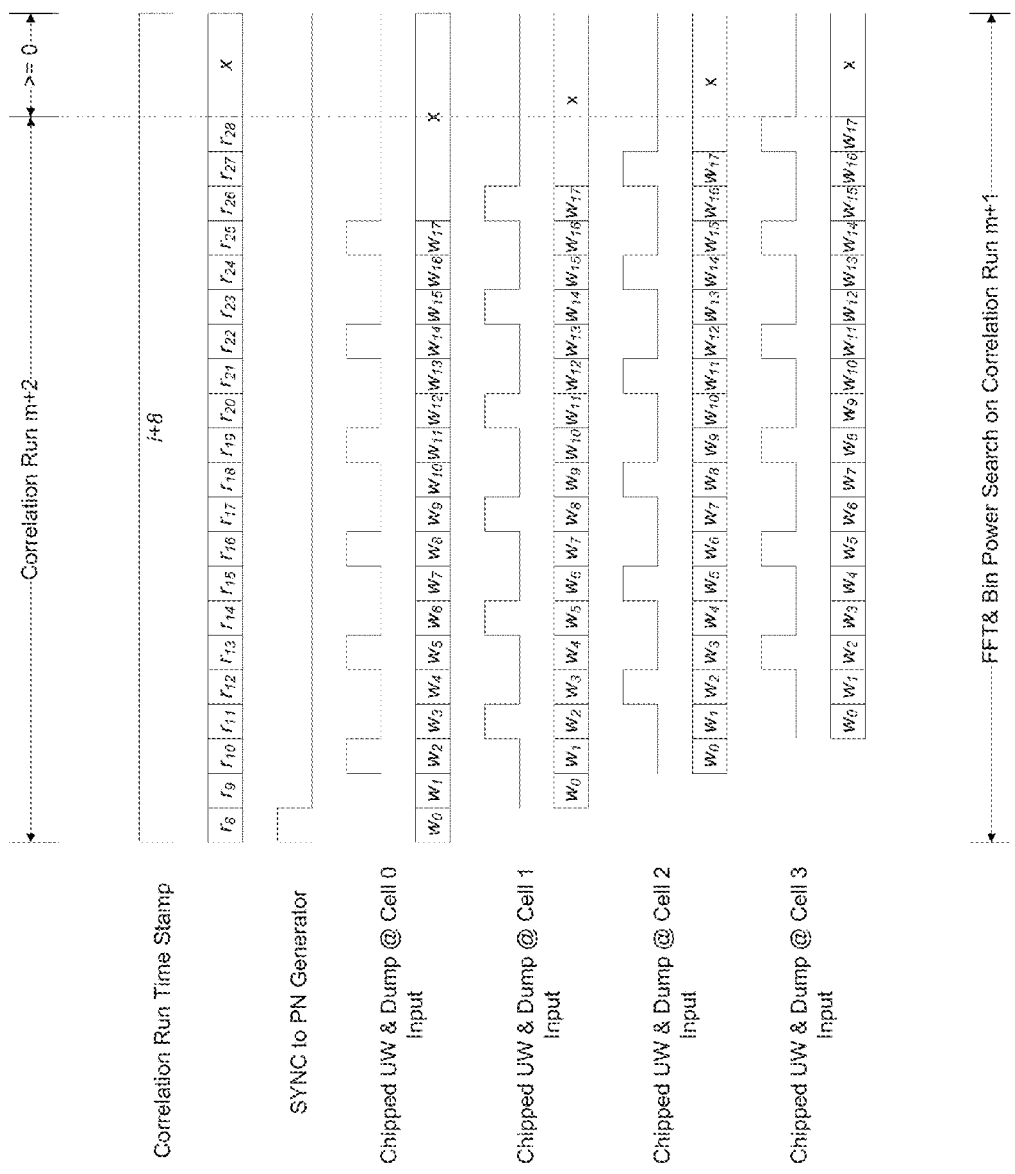

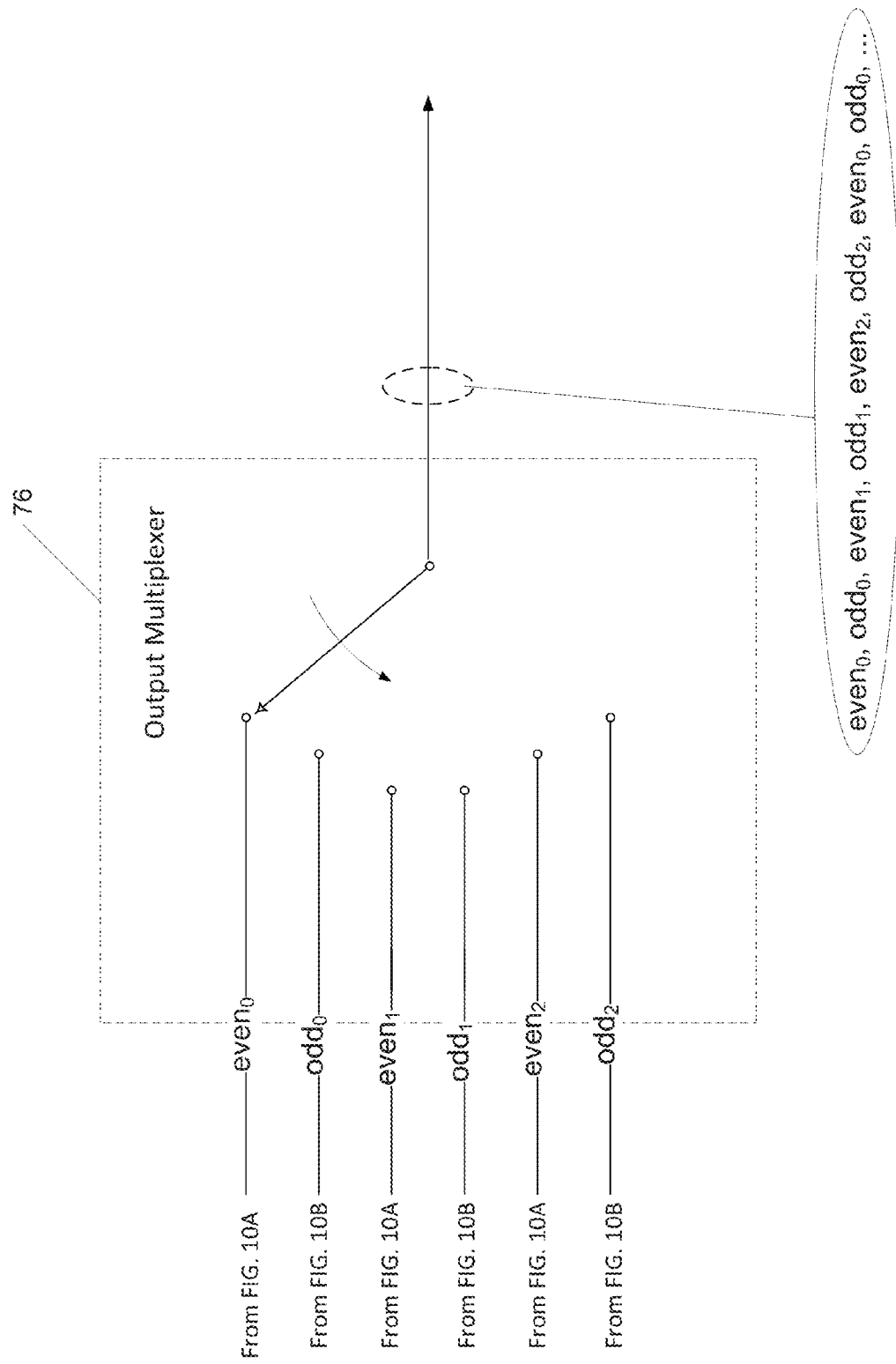

PN CODE SYNC DETECTION AND CARRIER FREQUENCY OFFSET ESTIMATION FOR THE DIRECT SEQUENCE SPREAD SPECTRUM RECEIVER

CROSS REFERENCE TO RELATED APPLICATIONS

This document claims the benefit of the filing date of U.S. Provisional Patent Application No. 61/721,951, entitled "PN Code Sync Detection and Carrier Frequency Offset Estimation for the Direct Sequence Spread Spectrum Receiver" to Lianfeng Peng, which was filed on Nov. 2, 2012, the disclosure of which is hereby incorporated entirely by reference herein.

BACKGROUND

1. Technical Field

Aspects of this document relate generally to telecommunication systems and techniques for transmitting data across a telecommunication channel.

2. Background Art

One of the most difficult and resource-intensive parts of Direct Sequence Spread Spectrum (DSSS) receiver design is the initial synchronization of the spread code in the receiver. In some applications, both chip clock and carrier frequency offsets can be assumed to be extremely small such that a simple correlation can be performed between the incoming chipped symbol stream and the locally generated spread code. However, in most applications, particularly in satellite communications, the assumption of small carrier frequency offsets cannot be made. Therefore, some amount of frequency correction is required, even though chip clock rates between the transmitter and receiver can be assumed close enough.

There are two popular conventional acquisition methods of direct sequence spread spectrum signals. The first one uses FIR filter structure with the PN code sequence bits as the FIR filter coefficients (FIR method). Implementations of the FIR method can correlate in real time and fast. However, it is resource-demanding and extremely inflexible if there are any changes to the spreading factor.

The second conventional acquisition method uses one or multiple correlators to correlate the incoming DSSS signal sequentially (serial search method). Implementations of the serial search method result in considerable reduction in complexity. However, acquisition may be very slow as only m possible PN sequence shifts per frame may be searches, where m is the number of correlators.

So as to reduce the complexity and length of the Detailed Description, and to fully establish the state of the art in certain areas of technology, Applicant herein expressly incorporates by reference all of the following materials:

The following references are hereby incorporated by reference in their entirety:
[1] Bernard Sklar, *Digital Communications: Fundamentals and Applications*, Prentice-Hall, Inc., Englewood Cliffs, N.J., 1988.
[2]. Ir. J. Meel, *Spread Spectrum (SS) Introduction*, De Nayer Instituut, December 1999.
[3]. Ir. J. Meel, *Spread Spectrum (SS) Applications*, De Nayer Instituut, December 1999.
[4]. Application Note 1890, *An Introduction to Direct-Sequence Spread-Spectrum Communications*, Dallas Semiconductor, February 2003.
[5]. Erik Strom, etc., *An Introduction to Spread Spectrum Systems*, Chamlers University of Technology, Sweden, January 2004.

Applicant believes that the material incorporated above is "non-essential" in accordance with 27 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant will amend the specification to expressly recite the essential material that is incorporated by reference as allowed by the applicable rules.

SUMMARY

Implementations of a method of detecting PN code synchronization for a direct sequence spread spectrum (DSSS) signal may comprise receiving, by a demodulator, a DSSS data signal comprising a data stream of data frames comprised of I and Q symbols, at least a portion of each data frame comprising a unique word, demodulating, by the demodulator, the data signal into I and Q chip samples, filtering, by a filter, the I and Q chip samples and outputting the filtered I and Q chip samples to a chip stream controller, and outputting, by the chip stream controller, a plurality of chip streams to an m×n correlation matrix. Implementations of the method may further comprise correlating the plurality of chip streams with the chipped unique word using m×n correlation cells within the correlation matrix and outputting a correlated data stream, running a plurality of Fast Fourier Transforms (FFTs) on the correlated output data stream and searching for a frequency bin having a maximum frequency bin power of each FFT run using a processor, searching for a maximum frequency bin power among the plurality of FFT runs using a PN synchronization detector, and determining, by the PN synchronization detector, whether PN synchronization is present.

Particular aspects may comprise one or more of the following features. The method may further comprise determining a carrier signal offset frequency and identifying a primary chip stream and a secondary chip stream. Each chip stream among the plurality of chip streams may be output to a separate m×n correlation matrix. The plurality of chip streams may comprise an even chip stream and an odd chip stream. The method may further comprise time-stamping each of the I and Q chip samples using a frame clock. The method may further comprise receiving, by a chip buffer, a plurality of chips from the plurality of chip streams from the chip stream controller. The chip buffer may continue receiving chips from the chip stream controller until the PN synchronization detector detects that PN synchronization is present. The method may further comprise simultaneously correlating the plurality of chip streams in parallel among the separate m×n correlation matrices. The method may further comprise sampling the primary chip stream closer to an eye diagram opening than the secondary chip stream is sampled. The method may further comprise sampling each chip stream among the plurality of chip streams at a midpoint between an eye diagram opening and an eye diagram closing. The method may further comprise outputting at least one of a primary and a secondary chip stream indicator, a PN synchronization shift value, and a carrier frequency offset in response to detecting that PN synchronization is present.

Implementations of a system for detecting PN code synchronization for a direct sequence spread spectrum (DSSS) signal may comprise a demodulator configured to receive a DSSS data signal comprising a data stream of data frames comprised of I and Q symbols, at least a portion of each data frame comprising a unique word and demodulate the data signal into I and Q chip samples, a filter configured to filter the I and Q chip samples and outputting the filtered chipped I and Q symbol samples to a chip stream controller, the chip stream controller configured to output a plurality of chip streams to an m×n correlation matrix, a processor configured to correlate the plurality of chip streams with the chipped unique word using m×n correlation cells within the correlation matrix and outputting a correlated data stream and run a plurality of Fast Fourier Transforms (FFTs) on the correlated output data stream and searching for a frequency bin having a maximum frequency bin power of each FFT run, and a PN synchronization detector configured to search for a maximum frequency bin power among the plurality of FFT runs and determine whether PN synchronization is present.

Particular aspects may further comprise one or more of the following features. The processor may be further configured to determine a carrier signal offset frequency and identify a primary chip stream and a secondary chip stream. Each chip stream among the plurality of chip streams may be output to a separate m×n correlation matrix. The plurality of chip streams may comprise an even chip stream and an odd chip stream. The system may further comprise a frame clock configured to time-stamp each of the I and Q chip samples. The system may further comprise a chip buffer configured to receive a plurality of chips from the plurality of chip streams from the chip stream controller. The chip buffer may be further configured to continue receiving chips from the chip stream controller until the PN synchronization detector detects that PN synchronization is present. The processor may be further configured to simultaneously correlate the plurality of chip streams in parallel among the separate m×n correlation matrices. The chip stream controller may be further configured to sample the primary chip stream closer to an eye diagram opening than the secondary chip stream is sampled. The chip stream controller may be further configured to sample each chip stream among the plurality of chip streams at a midpoint between an eye diagram opening and an eye diagram closing. The processor may be further configured to output at least one of a primary and a secondary chip stream indicator, a PN synchronization shift value, and a carrier frequency offset in response to detecting that PN synchronization is present.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventor is fully aware that he can be his own lexicographers if desired. The inventor expressly elects, as his own lexicographers, to use only the plain and ordinary meaning of terms in the specification and claims unless clearly stated otherwise and then further, expressly sets forth the "special" definition of that term and explain how it differs from the plain and ordinary meaning Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 9A-C provide an example of a timing diagram of a plurality of correlation runs according to an implementation of the system.

FIGS. 10A-C provide an example of an implementation of a correlation matrix structure.

DESCRIPTION

This disclosure, its aspects and implementations, are not limited to the specific components, frequency examples, or methods disclosed herein. Many additional components and assembly procedures known in the art consistent with the transmission of identification via meta-data are in use with particular implementations from this disclosure. Accordingly, although particular implementations are disclosed, such implementations and implementing components may comprise any components, models, versions, quantities, and/or the like as is known in the art for such systems and implementing components, consistent with the intended operation.

This disclosure relates to, but is not limited to, a method and system for detecting PN synchronization of a Direct Sequence Spread Spectrum (DSSS) signal. Particular implementations described herein are and may use, but are not limited to, Field-Programmable Gate Arrays (FPGA), digital signal processors, Application-Specific Integrated Circuits (ASIC), Programmable Integrated Circuits (PIC), or microprocessors.

Implementations of the methods and system disclosed herein can detect synchronization of a spread code in the presence of a large carrier frequency offset while also determining and outputting an estimation of this offset. Implementations of these systems and methods may provide one or more of the following advantages: 1) acquisition time may be adjusted to account for available resources; 2) acquisition speed may be easily increased by parallel processing without increasing implementation complexity; 3) a spreading factor is not limited to powers of 2, but may comprise any integer without extra complexity and cost of additional resources; and 4) the well-defined structure allows a same design to be easily ported to different platforms with different resource constraints. For example, constraints may comprise those such as limits on available memory, logic elements, or signal processing blocks such as multipliers.

Figure 1:
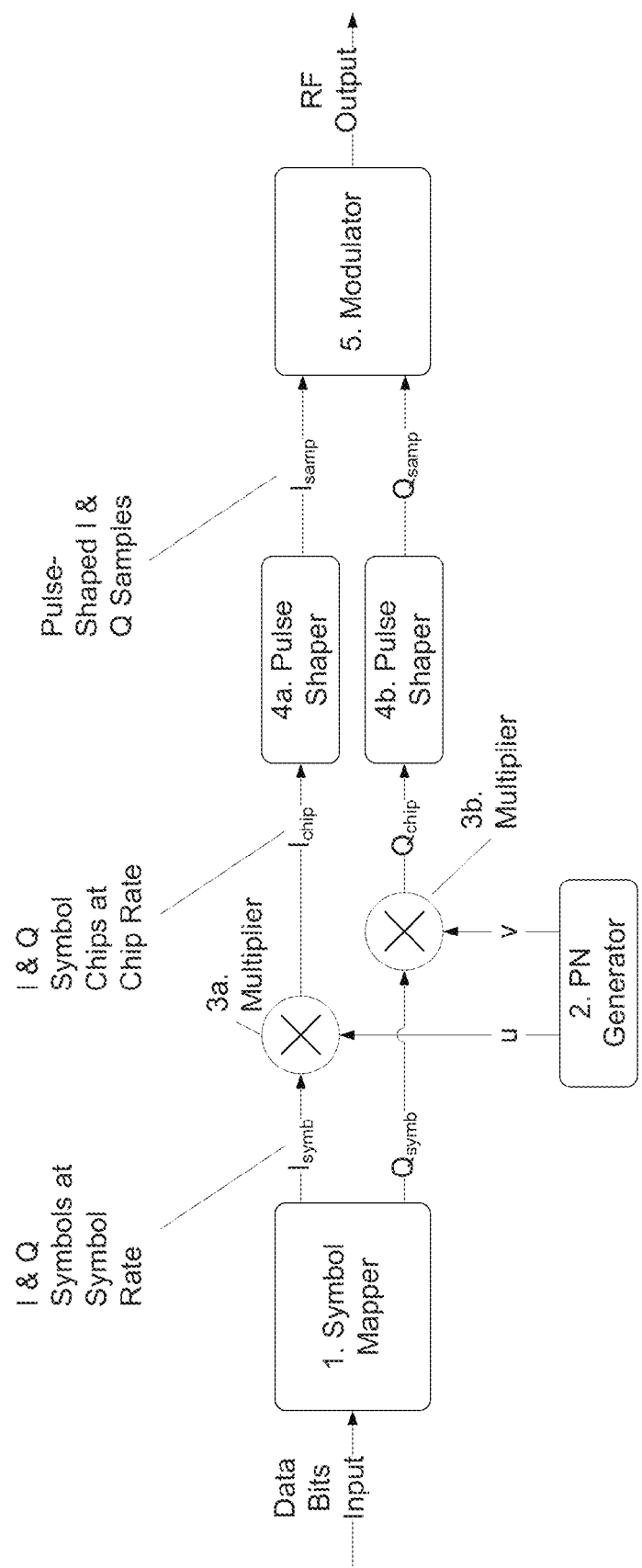
FIG. 1 depicts a prior art implementation of a Direct Sequence Spread Spectrum (DSSS) transmitter.
Figure 2:
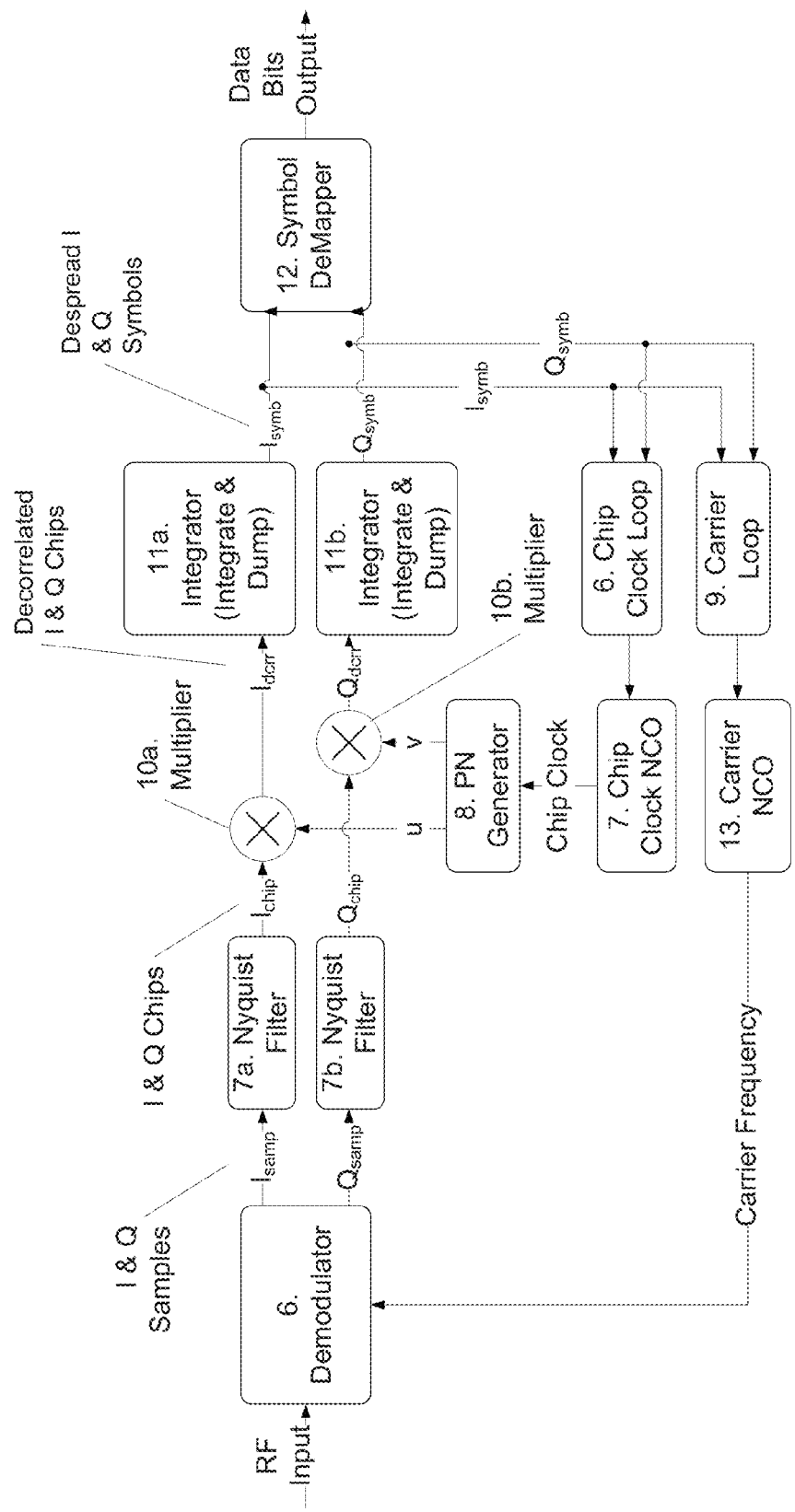
FIG. 2 depicts a prior art implementation of a Direct Sequence Spread Spectrum (DSSS) receiver.

An example of typical architecture of a Direct Sequence Spread Spectrum (DSSS) transmitter and receiver as commonly known in the art is shown in FIGS. 1-2, respectively.

In the transmitter, data bits, usually from a Forward-Error-Correction (FEC) encoder, are mapped to the desired modulation type first in Symbol Mapper 1. The Mapper 1 outputs, I & Q symbols, $I_{symb}$ & $Q_{symb}$, respectively, which are chipped or as is otherwise known in the art, spread, by PN Generator 2 and output as u and v to Multipliers 3a and 3b, respectively. The two PN sequences u and v may or may not be the same sequences. If they are different, it may be advantageous for them to have a low cross-correlation and be orthogonal. I & Q chips, $I_{chip}$ & $Q_{chip}$, as output by Multipliers 3a and 3b, respectively, go through Pulse Shapers 4a and 4b with a bandwidth equal to, for example, half the chip rate to constrain out-of-bandwidth power. Finally, outputs $I_{samp}$ & $Q_{samp}$ of Pulse Shapers 4a and 4b are modulated to create an RF signal in Modulator 5.

Modulation may be digital or in analog in Modulator 5. If done digitally, baseband samples, $I_{samp}$ & $Q_{samp}$, are digitally modulated first and then the modulated samples are converted to analog. If done in analog, the baseband samples $I_{samp}$ & $Q_{samp}$ are converted to analog first, and then the analog I & Q signals are modulated.

In a typical receiver, as shown in FIG. 2, demodulation can be accomplished digitally or by using analog-like modulation in Demodulator 6. If done digitally, the RF signal is digitalized, and then demodulated digitally to baseband I & Q symbol samples. If using an analog demodulator, the RF signal is demodulated in analog first to analog baseband I & Q symbol signals, and then the analog I & Q signals are digitalized to the baseband I & Q symbol samples.

In some implementations of a receiver, the baseband I & Q symbol samples $I_{samp}$ & $Q_{samp}$ from Demodulator 6 are filtered by Nyquist Filters 7a and 7b, respectively. Outputs $I_{chip}$ & $Q_{chip}$ of Nyquist Filters 7a and 7b are decorrelated using output sequences u and v of PN Generator 8 with Multipliers 10a and 10b, and then integrated over α chips and dumped once every α chips (known in the art as Integrate and Dump (I&D)) by Integrators 11a and 11b, where α is a factor of spectrum spreading called spreading factor. The integrator outputs $I_{symb}$ & $Q_{symb}$ are despread I & Q symbols. Symbol De-Mapper 12 de-maps the despread I & Q symbols $I_{symb}$ & $Q_{symb}$ to transmitted data bits, which are usually, but are not limited to, soft-decision data bits if they are fed to a Forward Error Correction (FEC) decoder.

Based on the despread I & Q symbols $I_{symb}$ & $Q_{symb}$, the chip clock is recovered by Chip Clock Loop 6 and Chip Clock Numerically Controlled Oscillator (NCO) 7, and the carrier is recovered by Carrier Loop 9 and Carrier NCO 10.

In general, the despreading process may comprise two phases: 1) initial acquisition of PN code synchronization and estimation of carrier frequency offset (also known as an acquisition phase); and 2) tracking of PN code synchronization, chip clock and carrier signal (also known as a tracking phase). The acquisition phase is typically the most demanding phase in complexity and resource utilization. The remainder of this disclosure describes implementations of a method and system for use primarily in the acquisition phase.

Figure 3:
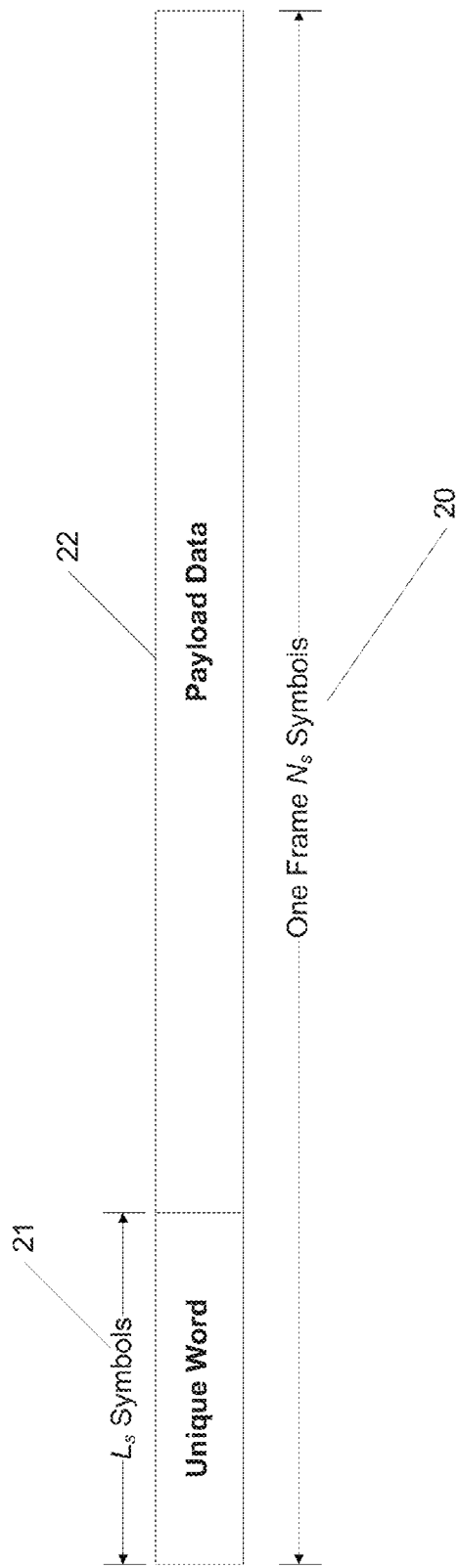
FIG. 3 provides an example of a transmit frame structure of an I & Q data symbol stream.

To aid PN spread code synchronization, in some implementations, a transmitted I & Q symbol stream is divided into frames 20 comprised of $N_s$ symbols each frame with a unique word (UW) 21 comprised of $L_s$ symbols prior to the payload data 22, as shown in FIG. 3. The PN spread code sequences u and v may be resynchronized at the beginning of each frame.

Figure 4:
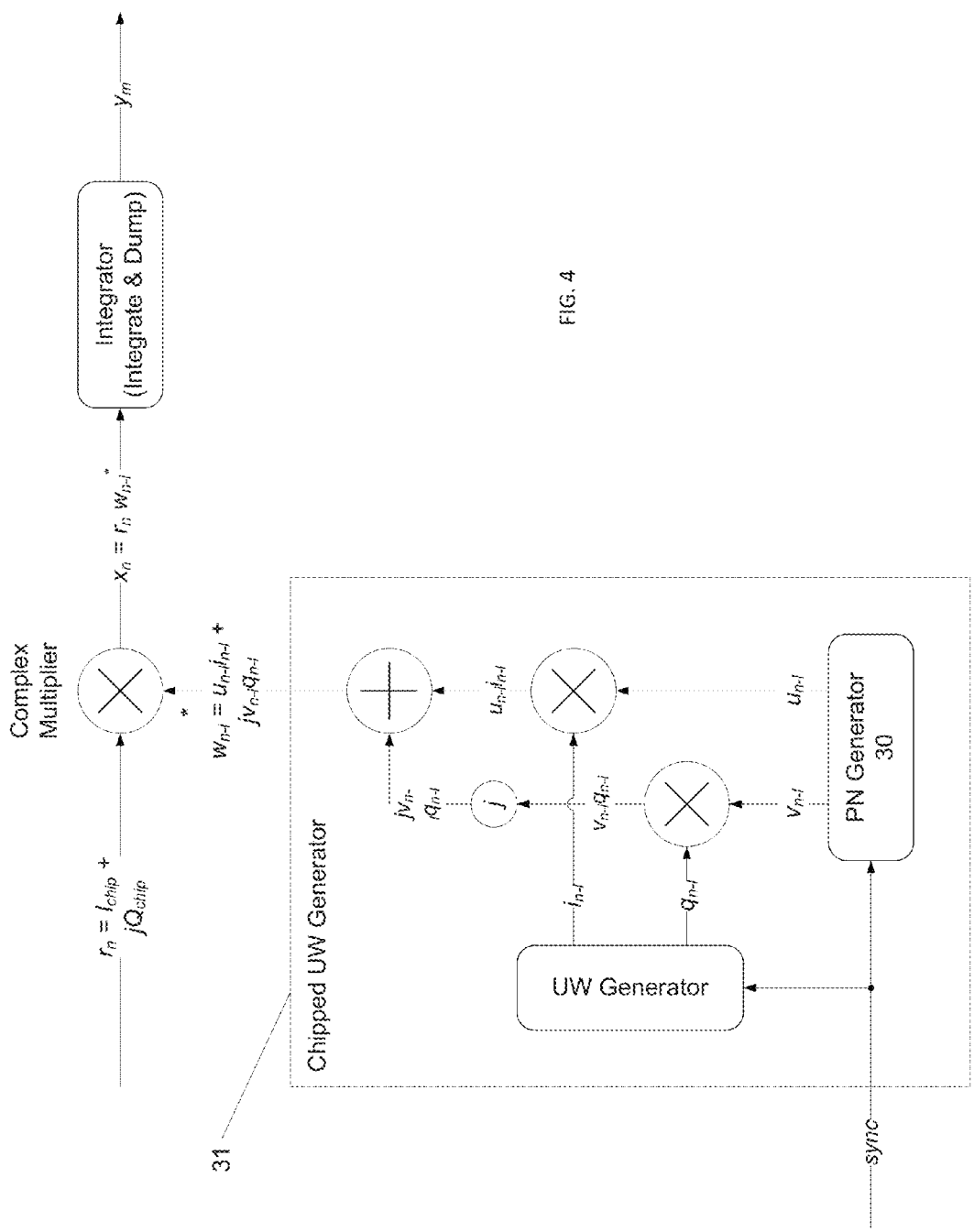
FIG. 4 depicts an implementation of a receiver configured to perform complex decorrelation.

In the receiver acquisition phase, the UW is chipped (spread) by the locally generated PN sequences using a local PN Generator 30 in accordance with an implementation such as that shown as an example in FIG. 4. The received chips are then decorrelated with the locally chipped UW. If the local PN code is in sync with the incoming PN sequences, the average decorrelating result has a carrier wave tone. By detecting a presence of the carrier wave tone, it may be possible to detect PN synchronization. The tone frequency provides an estimation of the carrier frequency offset.

The following is a derivation of an implementation of a method of detecting PN code synchronization and estimating carrier frequency offset. For ease of description, I and Q signals are represented in complex format. The I & Q chips $I_{chip}$ & $Q_{chip}$ in the transmitter can be represented as $$s_n = I_{chip}(n) + jQ_{chip}(n) = u_n i_n + jv_n q_n \quad \text{Equation 1}$$

where the PN sequences $u_n$ and $v_n$ take values of +1 or −1, and $i_n$ and $q_n$ are I & Q symbols changing once every α chips where α is the spreading factor:

$$i_n = I_{symb}\left(\left\lfloor \frac{n}{\alpha} \right\rfloor\right) \quad \text{Equation 2}$$
$$q_n = Q_{symb}\left(\left\lfloor \frac{n}{\alpha} \right\rfloor\right)$$

and the PN sequences $u_n$ and $v_n$ satisfy Equation 3 and Equation 4:

$$E\{u_m u_n\} = E\{v_m v_n\} = \begin{cases} 1, & \text{if } m = n \\ 0, & \text{otherwise} \end{cases} \quad \text{Equation 3}$$

$$E\{u_m v_n\} = \begin{cases} 1, & \text{if } m = n \text{ and } u_n = v_n \\ 0, & \text{otherwise} \end{cases} \quad \text{Equation 4}$$

Without loss of generality, signal power of $s_n$ is normalized to 1:

$$P_s = E\{s_n \times s^*_n\} = E\{(u_n i_n + j v_n q_n)(u_n i_n - j v_n q_n)\} =$$
$$E\{(u_n i_n)^2 + (v_n q_n)^2\} = E\{u_n^2\}E\{i_n^2\} +$$
$$E\{v_n^2\}E\{q_n^2\} = 1*E\{i_n^2\} + 1*E\{q_n^2\} = 1 \quad \text{Equation 5}$$

When the carrier frequency offset is not zero, some energy of the desired signal will be filtered out by Nyquist filter, but this does not practically affect a presence of the carrier wave and estimation of the carrier frequency offset, unless the offset is large enough (>+/−50% chip rate) that most of the signal energy is filtered out. Chip clock frequency offset may be practically negligible during the interval of interest, and therefore, the received I & Q chips at the Nyquist filter output can be approximated as follows:

$$r_n = I_{chip}(n) + jQ_{chip}(n) \approx s_{n-k} e^{j(n\omega + \theta)} z_n \quad \text{Equation 6}$$

where k is the unknown PN code synchronization shift (delay), $\omega$ is the carrier frequency offset normalized to chip rate, $\theta$ is the unknown carrier phase, and $z_n$ is low-pass complex Gaussian noise with independent real and imaginary components whose mean is 0 and variance is $0.5\sigma^2$. Therefore, the mean of $z_n$ is also 0 and its variance is $\sigma_r^2$:

$$z_n = z i_n + j z q_n \quad \text{Equation 7}$$

$$E\{z_n\} = E\{z i_n + j z q_n\} = 0 \quad \text{Equation 8}$$

$$E\{z_n \times z^*_n\} = E\{z i_n^2 + z q_n^2\} = E\{z i_n^2\} + E\{z q_n^2\} = 0.5\sigma_T^2 + 0.5\sigma_T^2 = \sigma_T^2 \quad \text{Equation 9}$$

Therefore, the received Signal to Noise Ratio (SNR) is $$\rho_r = \frac{E\{s_{n-k} \times s^*_{n-k}\}}{E\{z_n \times z^*_n\}} = \frac{P_s}{\sigma_r^2} = \frac{1}{\sigma_r^2} \quad \text{Equation 10}$$

The locally chipped UW complex sequence $w_n$ over $L = \alpha * L_s$ chips may be denoted as $$w_n = u_n i_n + j v_n q_n \quad \text{Equation 11}$$

It is then possible to decorrelate $r_n$ with the conjugate of $w_{n-l}$ (denoted as $w^*_{n-l}$) over the chipped UW length of $L = \alpha * L_s$ chips, where l is the delay controlled by the sync signal to the chipped UW generator 31:

$$x_n = r_n w^*_{n-l} = (s_{n-k} e^{j(n\omega + \theta)} + z_n) w^*_{n-l} = s_{n-k} e^{j(n\omega + \theta)} w^*_{n-l} + z_n w^*_{n-l}$$

$$= [(u_{n-k} i_{n-k} + j v_{n-k} q_{n-k}) e^{j(n\omega + \theta)}](u_n i_{n-l} - j v_{n-l} q_{n-l}) + z_n w^*_{n-l}$$

$$= [(u_{n-k} u_{n-l} i_{n-k} i_{n-l} + v_{n-k} v_{n-l} q_{n-k} q_{n-l})$$

$$+ j(v_{n-k} u_{n-l} q_{n-k} i_{n-l} - u_{n-k} v_{n-l} i_{n-k} q_{n-l})] e^{j(n\omega + \theta)} + z_n w^*_{n-l}$$

$$= (a_n + j b_n) e^{j(n\omega + \theta)} + c_n \quad \text{Equation 12}$$

where $$a_n = u_{n-k} u_{n-l} i_{n-k} i_{n-l} + v_{n-k} v_{n-l} q_{n-k} q_{n-l} \quad \text{Equation 13}$$

$$b_n = v_{n-k} u_{n-l} q_{n-k} i_{n-l} - u_{n-k} v_{n-l} i_{n-k} q_{n-l} \quad \text{Equation 14}$$

$$c_n = z_n w^*_{n-l} \quad \text{Equation 15}$$

If k≠l, then $$E\{a_n\} = E\{u_{n-k} u_{n-l} i_{n-k} i_{n-l} + v_{n-k} v_{n-l} q_{n-k} q_{n-l}\}$$

$$= E\{u_{n-k} u_{n-l}\} E\{i_{n-k} i_{n-l}\} + E\{v_{n-k} v_{n-l}\} E\{q_{n-k} q_{n-l}\}$$

$$= 0 * E\{i_{n-k} i_{n-l}\} + 0 * E\{q_{n-k} q_{n-l}\} = 0 \quad \text{Equation 16}$$

$$E\{b_n\} = E\{v_{n-k} u_{n-l} q_{n-k} i_{n-l} - u_{n-k} v_{n-l} i_{n-k} q_{n-l}\}$$

$$= E\{v_{n-k} u_{n-l}\} E\{q_{n-k} i_{n-l}\} - E\{u_{n-k} v_{n-l}\} E\{i_{n-k} q_{n-l}\}$$

$$= 0 * E\{q_{n-k} i_{n-l}\} + 0 * E\{i_{n-k} q_{n-l}\} = 0 \quad \text{Equation 17}$$

If k=l, then $$E\{a_n\} = E\{u_{n-k} u_{n-k} i_{n-k} i_{n-k} + v_{n-k} v_{n-k} q_{n-k} q_{n-k}\}$$

$$= E\{u_{n-k} u_{n-k}\} E\{i_{n-k} i_{n-k}\} + E\{v_{n-k} v_{n-k}\} E\{q_{n-k} q_{n-k}\}$$

$$= 1 * E\{i_{n-k} i_{n-k}\} + 1 * E\{q_{n-k} q_{n-k}\} = 1 \quad \text{Equation 18}$$

$$E\{b_n\} = E\{v_{n-k} u_{n-k} q_{n-k} i_{n-k} - u_{n-k} v_{n-k} i_{n-k} q_{n-k}\} = E\{0\} = 0 \quad \text{Equation 19}$$

For all values of k and l, the expected value of $c_n$ is always 0:

$$E\{c_n\} = E\{z_n w^*_{n-l}\} = E\{z_n\} E\{w^*_{n-l}\} = 0 \quad \text{Equation 20}$$

Therefore, $$E\{x_n\} = E\{r_n w^*_{n-l}\} = \begin{cases} e^{j(n\omega + \theta)}, & \text{if } k = l \\ 0, & \text{otherwise} \end{cases} \quad \text{Equation 21}$$

Thus, if the local PN sequence is in sync with the incoming PN sequence, the result of complex decorrelation is a carrier wave tone, otherwise the average result will be 0.

One way to detect the carrier wave tone is to run a complex Fast Fourier Transform (FFT) of $x_n$ over the UW length of $L = \alpha * L_s$ chips. However, because L is proportional to the spreading factor $\alpha$, the FFT length is also proportional to $\alpha$. If the maximum spreading factor is very large, the FFT length can be so large it may become impractical to implement.

A practical alternative used in some implementations is to run complex FFT of $y_m$, the average over $\alpha$ chips of $x_n$, as defined by Equation 22:

$$y_m = \frac{1}{\alpha} \sum_{i=0}^{\alpha-1} x_{\alpha m - i} = \quad \text{Equation 22}$$

$$\frac{1}{\alpha} \sum_{i=0}^{\alpha-1} (a_{\alpha m - i} + j b_{\alpha m - i}) e^{j[(\alpha m - i)\omega + \theta]} + \frac{1}{\alpha} \sum_{i=0}^{\alpha-1} c_{\alpha m - i}$$

When k≠l, $$E\{y_m\} = \frac{1}{\alpha} \sum_{i=0}^{\alpha-1} E\{x_{\alpha m - i}\} = 0 \quad \text{Equation 23}$$

When k=l, $$E\{y_m\} = \frac{1}{\alpha} \sum_{i=0}^{\alpha-1} E\{x_{\alpha m - i}\} = \frac{1}{\alpha} \sum_{i=0}^{\alpha-1} e^{j[(\alpha m - i)\omega + \theta]} = \quad \text{Equation 24}$$

$$\frac{e^{j(\alpha m\omega+\theta)}}{\alpha}\sum_{i=0}^{\alpha-1}e^{-ji\omega} = \frac{\sin(\frac{\alpha\omega}{2})}{\alpha*\sin(\frac{\omega}{2})}e^{j(\alpha-1)\frac{\omega}{2}}e^{j(\alpha m\omega+\theta)} =$$

$$\frac{\sin(\pi f_s)}{\alpha*\sin(\frac{\pi f_s}{\alpha})}e^{j\frac{(\alpha-1)\pi f_s}{\alpha}}e^{j(m2\pi f_s+\theta)} = W(f_s)e^{j(m2\pi f_s+\theta)}$$

Therefore, the expected value of $y_m$ is $$E\{y_m\} = \begin{cases} W(f_s)e^{j(m2\pi f_s+\theta)}, & \text{if } k=l \\ 0, & \text{otherwise} \end{cases} \quad \text{Equation 25}$$

Where $f_s$ is the carrier frequency offset normalized to symbol rate instead of chip rate, and $W(f_s)$ is a weighting factor due to the effect of integrate-and-dump over $\alpha$ chips:

$$W(f_s) = \frac{\sin(\pi f_s)}{\alpha*\sin(\frac{\pi f_s}{\alpha})}e^{j\frac{(\alpha-1)\pi f_s}{\alpha}} \quad \text{Equation 26}$$

Figure 5:
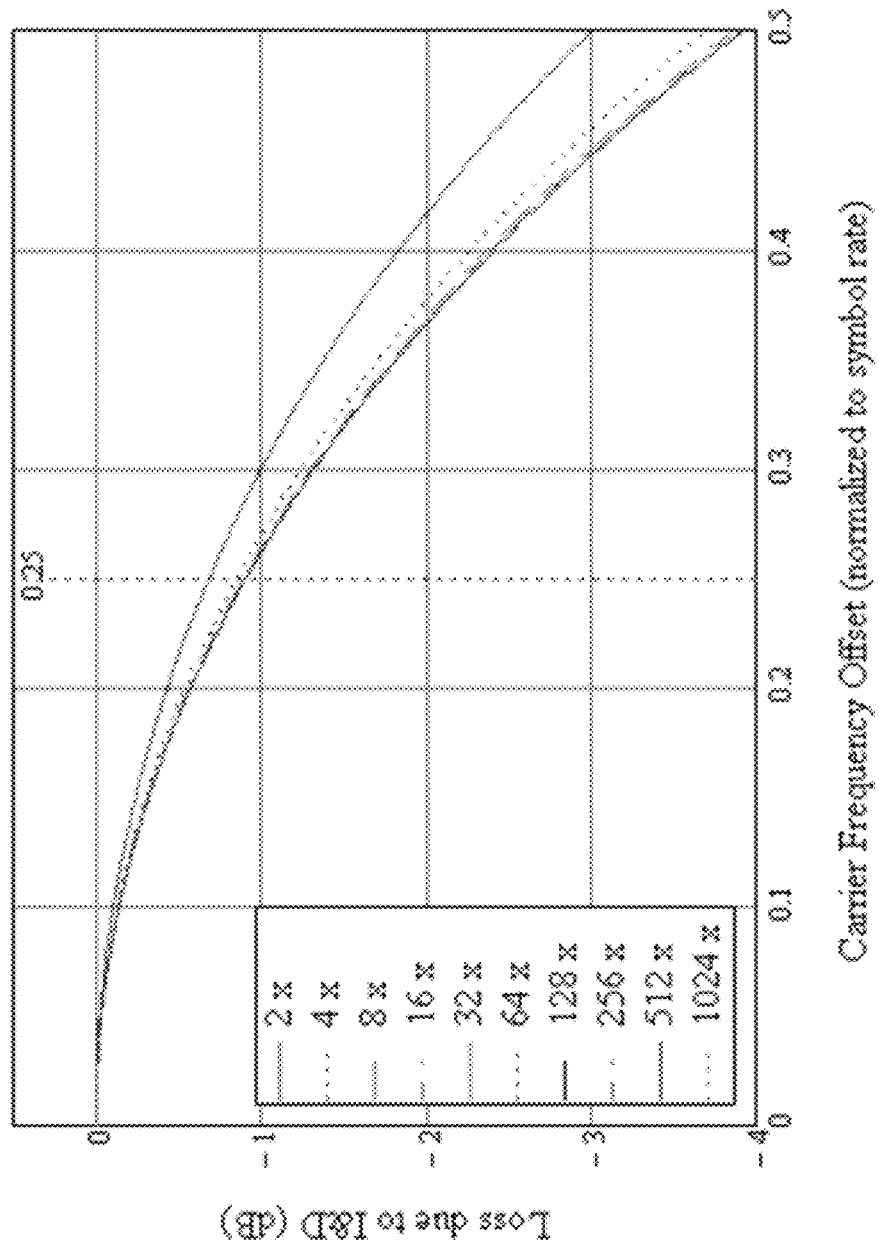
FIG. 5 is a graph of average carrier wave tone loss versus carrier frequency offset.

Instead of running a complex FFT of $x_n$ over L=$\alpha$*$L_s$ chips, in some implementations, a complex FFT is run of $y_m$ over $L_s$ symbols, which is independent of the spreading factor $\alpha$. This may substantially reduce implementation complexity and resource requirements. Because of the averaging, the carrier wave tone now has a weighting factor of $W(f_s)$, which is a loss of the tone amplitude as a function of the carrier frequency offset $f_s$. The larger the carrier frequency offset $f_s$, the larger the loss, as seen in FIG. 5, which may be important to take into consideration when designing the detection circuitry at a large carrier frequency offset. However, as shown in FIG. 5, if the offset is within +/−25% of the symbol rate, the loss is rather small, less than 1 dB as seen in the figure.

Noise power $\sigma^2$ in $y_m$ can be derived as follows. As seen in Equation 22, the noise component is that $$d_m = \frac{1}{\alpha}\sum_{i=0}^{\alpha-1}c_{\alpha m-i} = \frac{1}{\alpha}\sum_{i=0}^{\alpha-1}z_{\alpha m-i}w^*_{\alpha m-i-l} \quad \text{Equation 27}$$

With a mean of:

$$\mu = E\{d_m\} = \quad \text{Equation 28}$$
$$E\left\{\frac{1}{\alpha}\sum_{i=0}^{\alpha-1}z_{\alpha m-i}w^*_{\alpha m-i-l}\right\} = \frac{1}{\alpha}\sum_{i=0}^{\alpha-1}E\{z_{\alpha m-i}w^*_{\alpha m-i-l}\} = 0$$

and a power of:

$$\sigma^2 = E\{d_m \times d^*_m\} = \quad \text{Equation 29}$$
$$E\left\{\left(\frac{1}{\alpha}\sum_{i=0}^{\alpha-1}z_{\alpha m-i}w^*_{\alpha m-i-l}\right)\left(\frac{1}{\alpha}\sum_{j=0}^{\alpha-1}z^*_{\alpha m-j}w_{\alpha m-j-l}\right)\right\} =$$

$$\frac{1}{\alpha^2}\sum_{i=0}^{\alpha-1}\sum_{j=0}^{\alpha-1}E\{(z_{\alpha m-i}w^*_{\alpha m-i-l})(z^*_{\alpha m-j}w_{\alpha m-j-l})\} =$$

$$\frac{1}{\alpha^2}\sum_{i=0}^{\alpha-1}\sum_{j=0}^{\alpha-1}E\{z_{\alpha m-i}z^*_{\alpha m-j}\}E\{w^*_{\alpha m-i-l}w_{\alpha m-j-l}\} =$$

$$\frac{1}{\alpha^2}\sum_{i=0}^{\alpha-1}E\{z_{\alpha m-i}z^*_{\alpha m-i}\}E\{w^*_{\alpha m-i-l}w_{\alpha m-i-l}\} =$$

$$\frac{1}{\alpha^2}\sum_{i=0}^{\alpha-1}(\sigma_r^2*1) = \frac{\sigma_r^2}{\alpha}$$

Power of noise $d_m$ is reduced by $\alpha$ time compared to the input noise. SNR of $E\{y_m\}$ can be calculated as $$\rho = \frac{E\{y_m\} \times E\{y_m\}*}{E\{d_m \times d^*_m\}} + \frac{\alpha}{\sigma_r^2}|W(f_s)|^2 = \alpha\rho_r|W(f_s)|^2 \quad \text{Equation 30}$$

Figure 6:
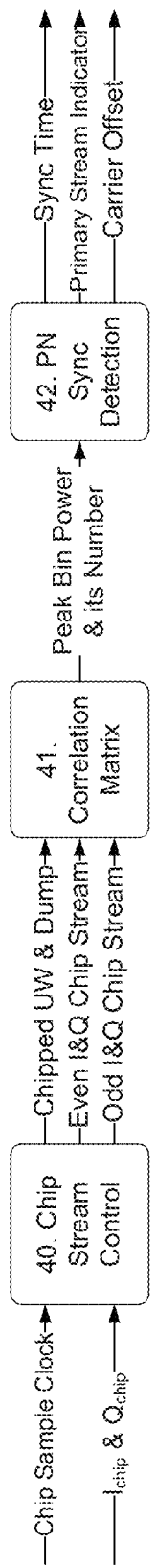
FIG. 6 is a block diagram of an implementation of a signal acquisition phase of a receiver.

A top-level block diagram of an implementation of an acquisition phase is shown in FIG. 6. In some implementations, during acquisition, chip clock and carrier recovery loops are run in an open loop, so that the locally generated chip clock and carrier frequencies are free-running Once PN synchronization is detected, the chip stream with the highest correlation peak is determined, and the carrier offset estimation is used to correct the carrier NCO. The chip clock and carrier recovery loops are then closed, and the despread process enters the tracking phase.

Referring to FIG. 6, in one implementation, I & Q chip sample streams from the Nyquist filter may be sampled at two samples per chip. Chip Stream Control 40 splits the input chip sample stream to even and odd chip streams at one sample per chip, and generates chipped UW and dump signals to control decorrelation. In general, with open-loop chip clock loop, one of the two even and odd chip streams will be sampled closer to the opening of an eye diagram and has higher correlation energy. As one of ordinary skill in the art would recognize, the eye diagram is an oscilloscope display of a digital signal, repetitively sampled to get a good representation of its behavior. In one implementation, the chip stream sampled closer to the eye opening may be designated as the primary chip stream and used to generate despread I & Q symbols, and the other near +/−half chip off the eye opening may be designated as the secondary stream to generate chip clock phase offset.

Correlation Matrix 41 correlates the even and odd chip streams with chipped UW in m×n correlation cells for each chip stream, effectively running correlation in parallel by m×n correlators on each chip stream. The Correlation Matrix 41 then runs one or more FFT's on the results and searches for the bin with the maximum bin power of each FFT run.

PN Synchronization Detection Unit 42 searches for the maximum peak bin power of all FFT runs, and use it to determine if PN synchronization is present among any one of the 2×m×n correlations. If yes, PN sync is detected. Then carrier frequency offset can be determined, and the primary and secondary chips can be identified.

Figure 8:
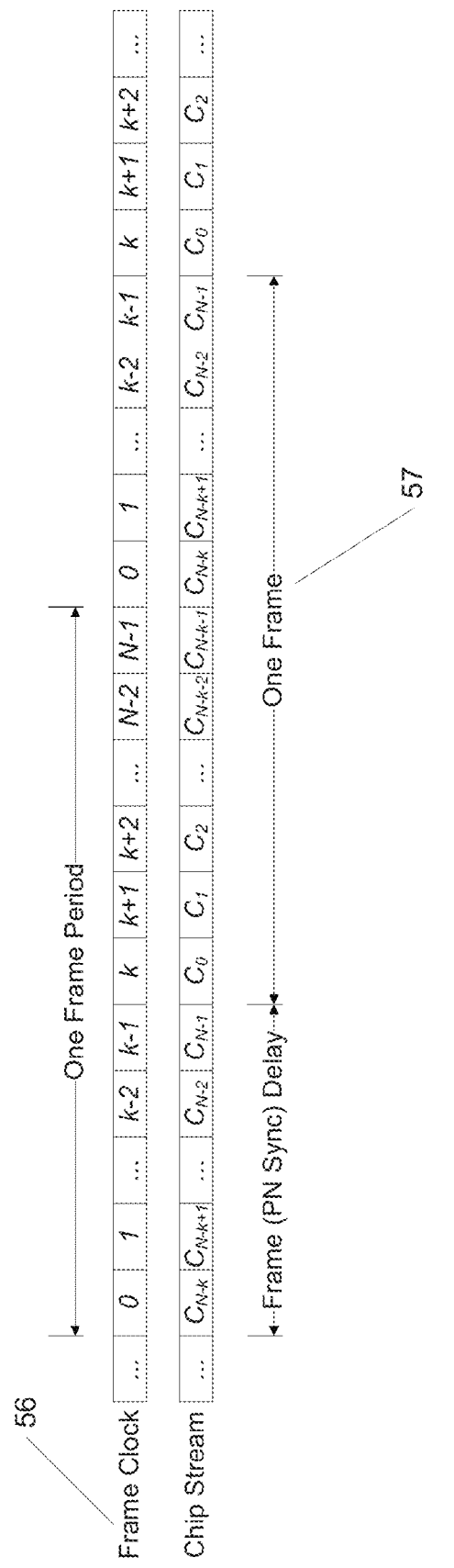
FIG. 8 is a diagram of an example of timed chip slots of a data frame.

Further discussion of individual blocks depicting various implementations is as follows:

A Frame Clock 56 may be defined to time-stamp each and every pair of even and odd chips. The Frame Clock 56 may be a counter of modulo frame length N running at a chip rate, as shown in FIG. 8. If the first chip, shown here as $C_0$, of a frame 57 arrives at frame time k, the first chip of the next frame will also arrive at frame time k but N chips later.

Figure 9A:
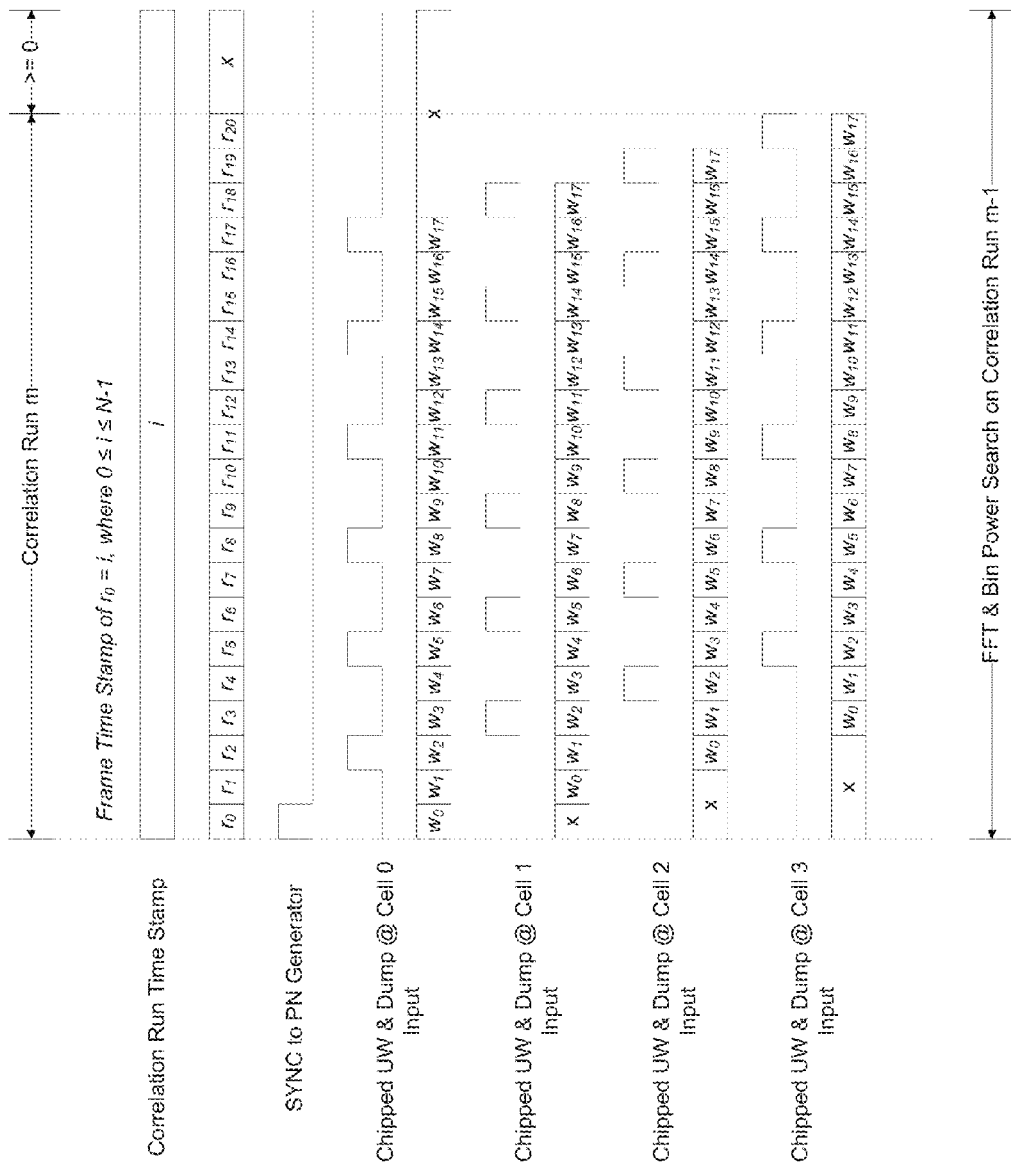
Figure 9B:
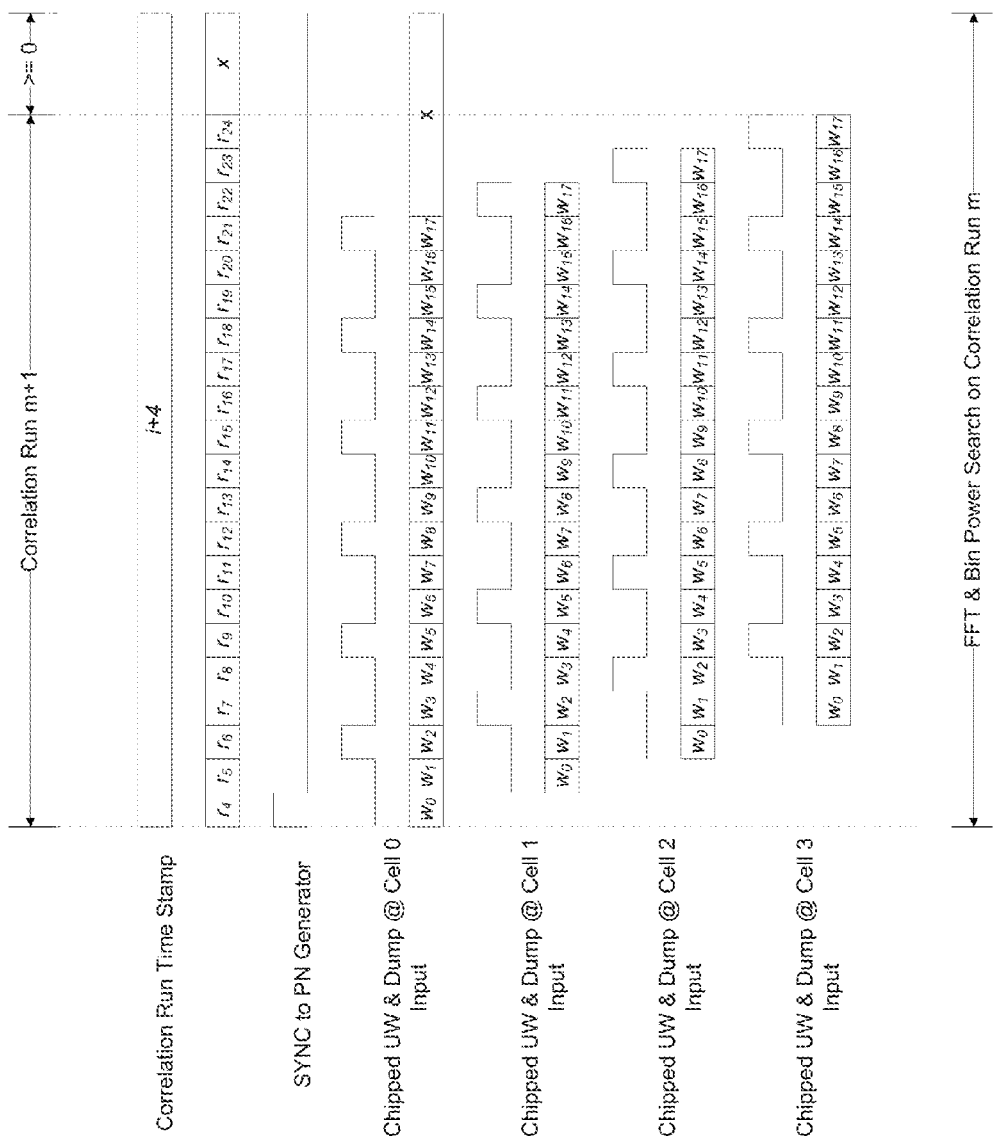

A correlation run may also be defined as a correlation over L chips by the m×n correlation cells of each chip stream in Correlation Matrix 41. FIG. 9 shows an example with m×n=4 correlation cells, spreading factor α=3 and UW length $L_s$=6 symbols, however, any other applicable values may be used as this example is merely for illustration purposes. Each and every correlation run is also time-stamped with the time stamp of the first chip of the run.

Figure 7:
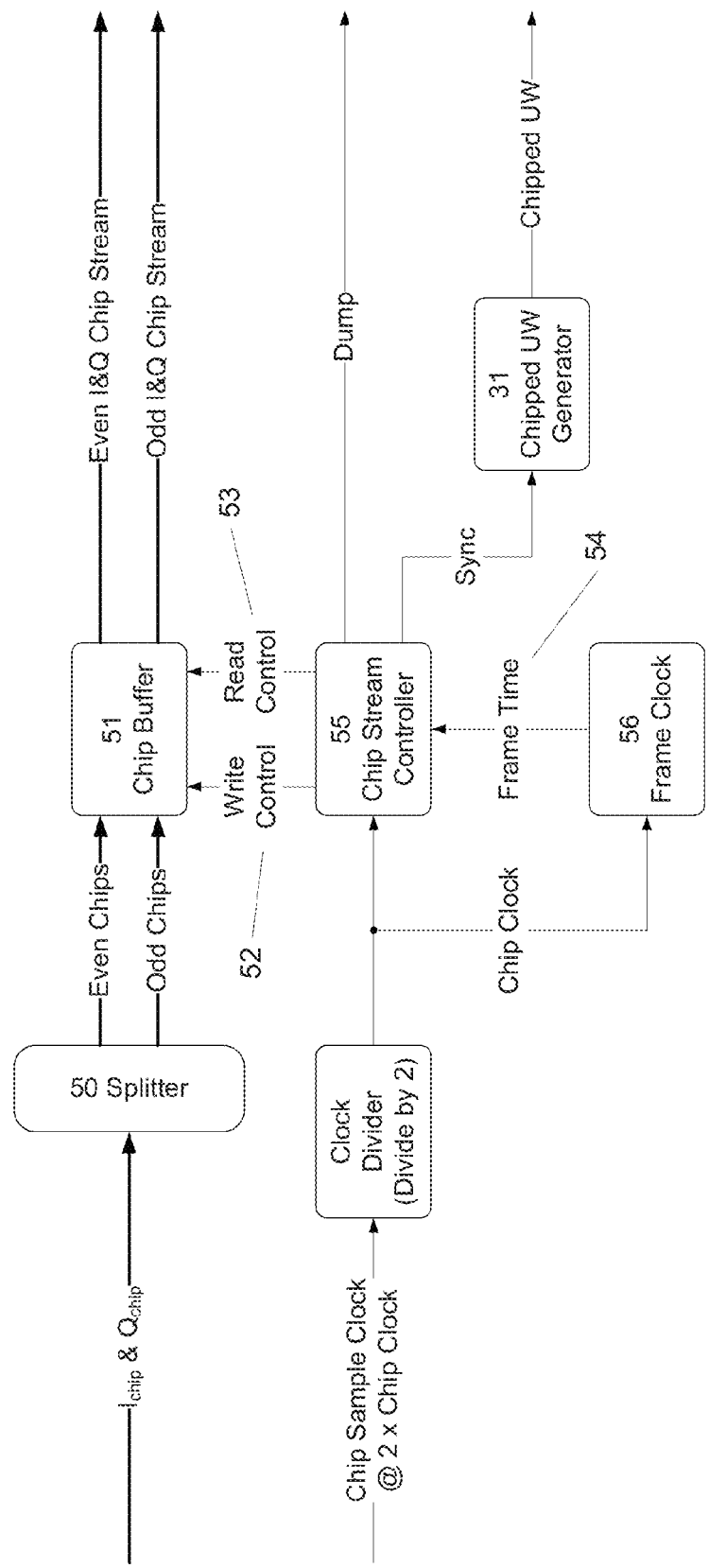
FIG. 7 is a block diagram of an implementation of a chip stream control structure.

Referring to FIG. 7, I & Q chip samples, $I_{chip}$ and $Q_{chip}$, from a Nyquist filter are split into even and odd chip streams in Splitter 50, and buffered as pairs in Chip Buffer 51. The Buffer write 52 and read pointers 53 may have an associated frame time indicator 54 generated by frame clock 56 and indicating the frame time of the chip pairs stored at the location of the pointers 52, 53.

Chip Stream Controller 55 may keep filling Chip Buffer 51 until it is full or PN synchronization is detected. Chip pairs may continue to be read out of the buffer 51 at the processing clock rate as long as there are chips available.

Depending on frame length, UW length, spreading factor, ratio of processing clock rate to chip rate, and any other relevant factors, Chip Buffer 51 may or may not be full before PN synchronization is detected. If Chip Buffer 51 is full before PN synchronization is detected, Chip Stream Controller 55 stops filling and waits until the next frame has arrived, while continuing reading out the previously filled chips for processing.

For each correlation run, (L+m×n−1) chip pairs are read out of Chip Buffer 51. After each correlation run, the read pointer advances by m×n locations for the next run, if PN synchronization is not yet detected. Thus, a frame of N chips can be searched for PN synchronization in N/(m×n) correlation runs at most.

In some implementations, during each correlation run, a FFT is performed on the previous correlation run result and the bin with the highest peak is selected. There may be a gap between correlation runs to allow enough time for the FFT and power bin search processing (see for example, FIGS. 9A-C, which denote such a gap with an "x" following the time stamp blocks of $r_0$=i prior to the next correlation run).

Figure 10A:
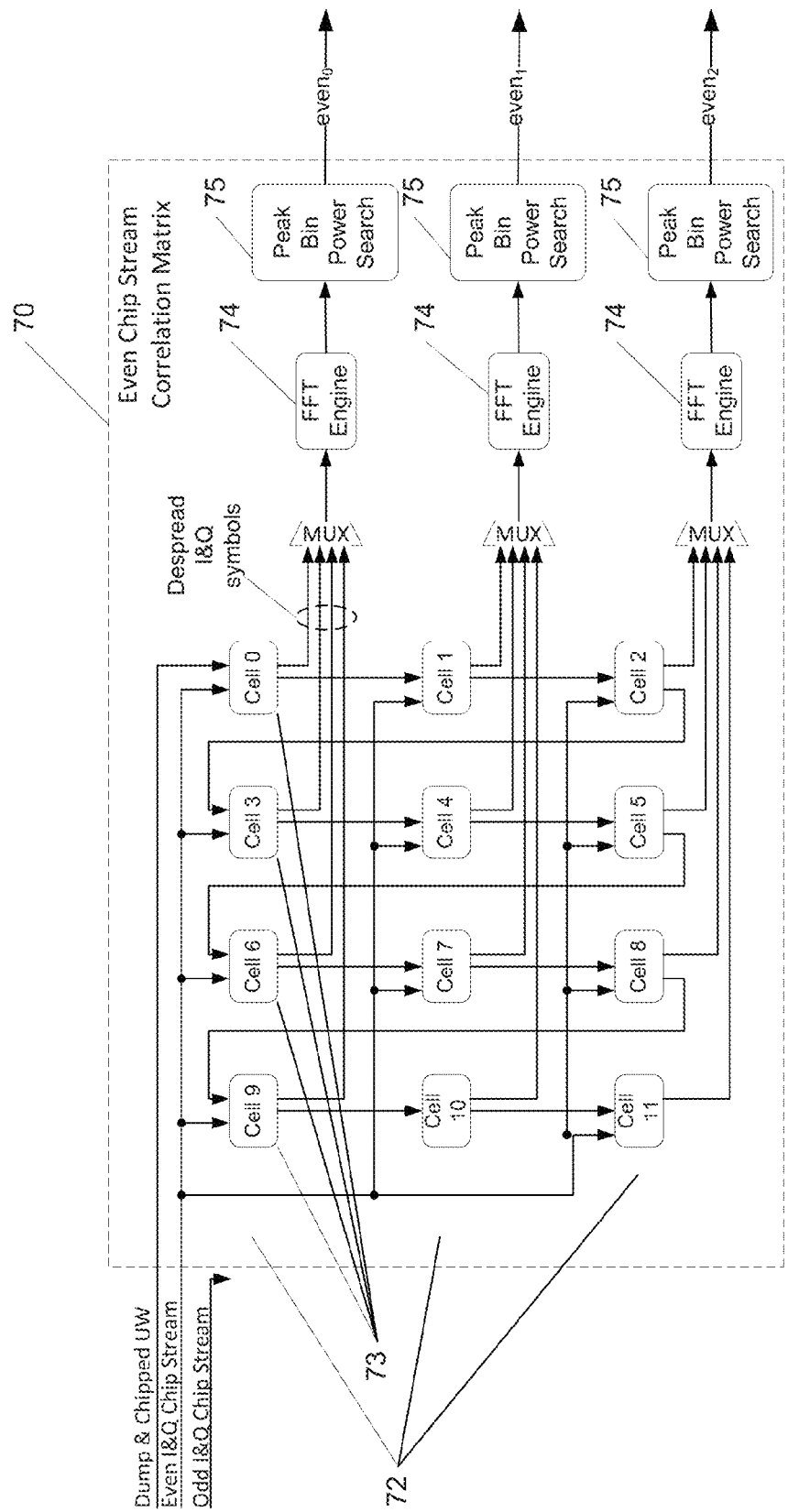
Figure 10B:
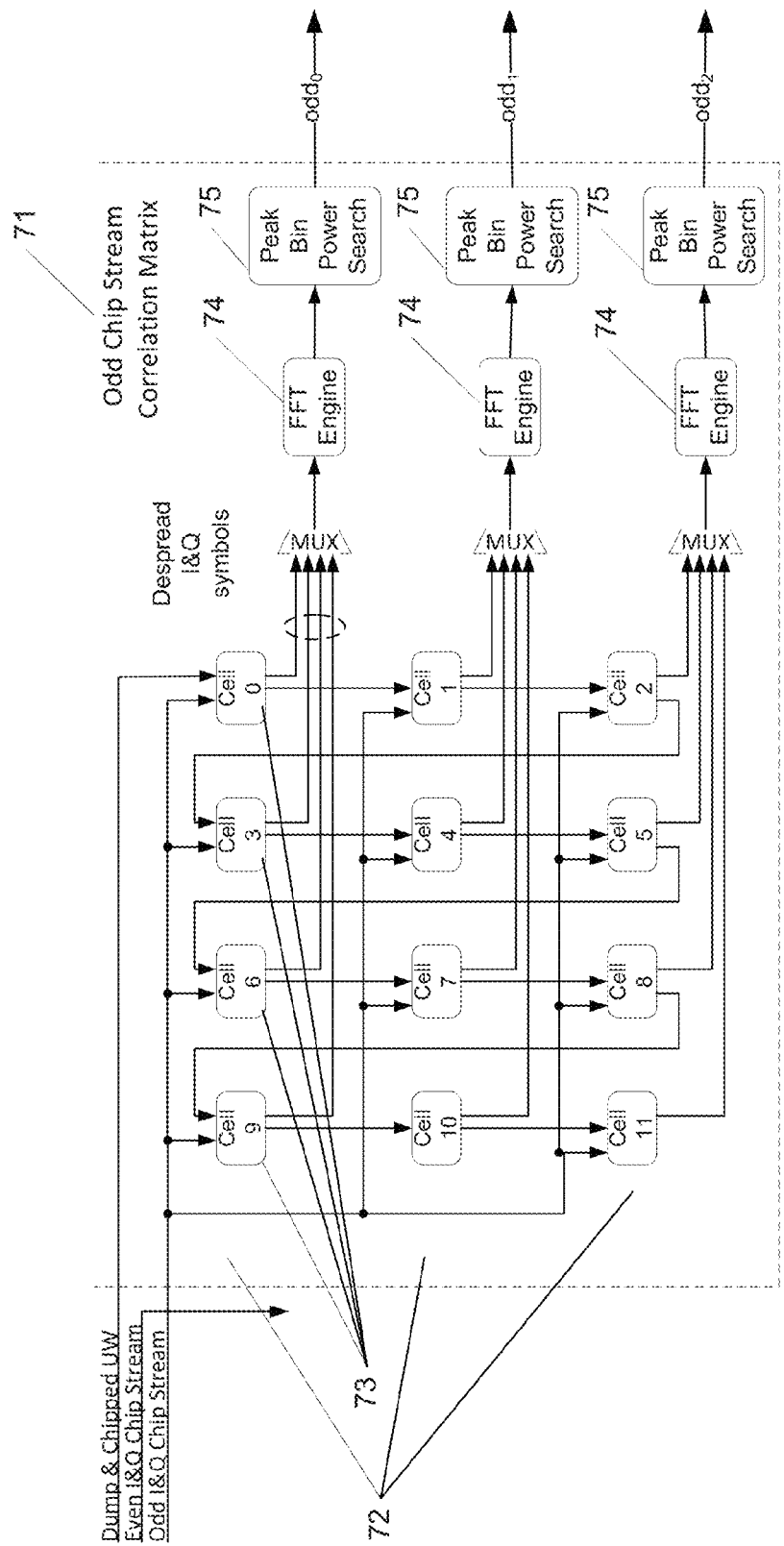

Referring now to FIGS. 10A-C, in some implementations of acquisition, correlation energy detection is identical in both chip streams, as there is no knowledge which chip stream is sampled closer to the eye diagram opening.

Correlation may be done in parallel by m×n correlation cells arranged in an m×n matrix in Even Chip Stream Correlation Matrix 70 and Odd Chip Stream Correlation Matrix 71 for even and odd chip streams, respectively. Shown in FIGS. 10A-B is an example of correlation matrix comprising a total of m×n=3×4=12 correlation cells for each chip stream, where in this example, m=3 and n=4; however any appropriate integer values may replace m and n in this example depending upon the resources available for practical implementation. For every (L+m×n−1) input chips, m×n of N possible PN synchronization shifts are searched.

Figure 11:
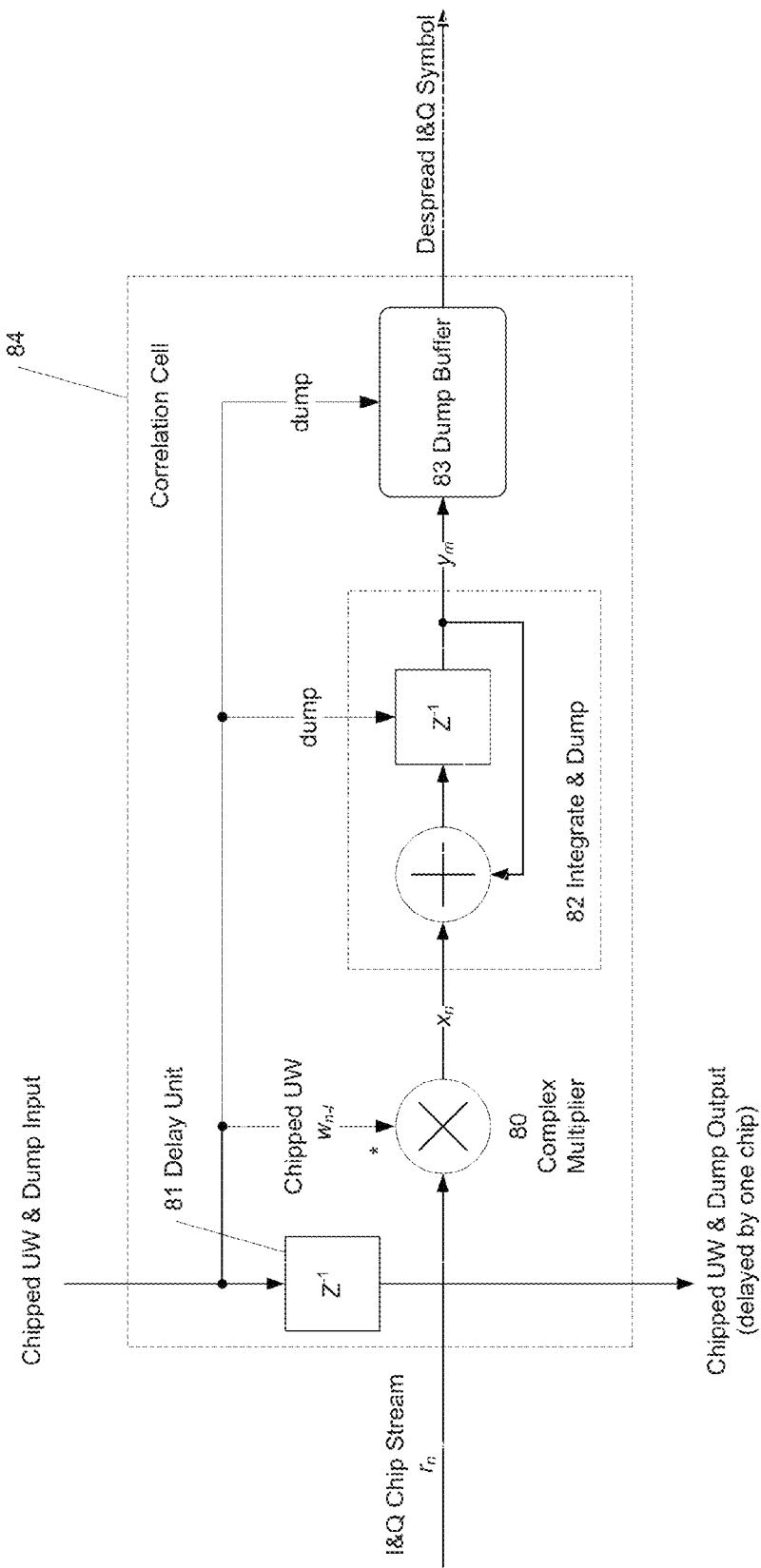
FIG. 11 is an example of an implementation of a correlation cell structure.

Referring now to FIG. 11, in some implementations, each correlation cell 84 correlates the chip stream with chipped UW $w_{n-l}$ by Complex Multiplier 80, where/is the locally generated PN synchronization delay, and the star "*" next to the multiplier means complex-multiplying with the conjugate of chipped UW $w_{n-l}$. The cell also delays its input chipped UW and dump signals by one chip in Delay Unit 81 and outputs them for the next cell in line. The output of Complex Multiplier 80 is accumulated over α chips and then dumped once in the Integrate & Dump Unit 82. The output of the Integrate & Dump Unit 82 is loaded to Dump Buffer 83 once every α chips.

An example of relative timing of each correlation cell's chipped UW and dump input signals is illustrated in FIG. 9 for the case of m×n=4 correlation cells, spreading factor α=3 and UW length $L_s$=6 symbols.

The n correlation cells 73 of each row 72 share one FFT Engine 74 and one Peak Bin Power Search Unit 75. The FFT engine reads the $L_s$ despread complex I & Q symbols of the previous correlation run from Dump Buffer 83 of each cell 73 on its row 72 and runs K-point FFT's on them, where K>=$L_s$. If K>$L_s$, (K−$L_s$) points are zero-padded. The FFT engine 74 may run one cell 73 a time with the earlier cell's output run first.

Peak Bin Power Search Unit 75 simply finds the bin with the most power from the FFT engine output for each cell's FFT run, and outputs the bin number and its bin power. In some implementations, the method works as follows.

Assume $Y_m$ (m=0, 1, ..., K−1) is the K-point FFT bins of the $L_s$ despread complex I & Q symbols from a correlation cell 73. Peak Bin Power Search Unit 75 computes the bin power first by Equation 31:

$$P_m = |Y_m|^2 \qquad \text{Equation 31}$$

The system then searches for the peak power (maximum power) among the K bin powers and the corresponding bin number:

$$P_{pk} = P_i = \max_{m=0,1,\ldots,K-1} \{P_m\} \qquad \text{Equation 32}$$

The output is a bin number i and peak bin power $P_{pk}$=$P_i$ for the corresponding correlation cell 73. Outputs from all Peak Bin Power Search blocks are multiplexed back in serial according to their time orders by Output Multiplexer 76 before being sent out. Depending on available implementation resources, m and n can be selected to trade resources for acquisition time.

In each correlation run, a total of (2×m×n) correlations may be done on both chip streams, resulting in a total of (2×m×n) peak bin powers and corresponding bin numbers, one for each correlation cell 73.

The (2×m×n) peak bin powers may be denoted as Pe(i, $j_i$) and Po(i, $j_i$) for even and odd streams, respectively, where i, ranging from 0 to (m×n−1), is the correlation cell number, and $j_i$, ranging from 0 to K=1, is the bin number, of which bin $j_i$ has the peak power in Correlation Cell i's FFT.

PN Sync Detection 42 finds the maximum peak power among the (2×m×n) peak powers as:

$$P_{max} = \max_{i=0,1,\ldots,m*n-1} \{Pe(i, j_i), Po(i, j_i)\} \qquad \text{Equation 33}$$

In some implementations, T may be denoted as a predetermined threshold to decide if the maximum peak bin power is higher enough to declare PN sync detected. If $P_{max}$ satisfies $$P_{max} = Pe(t, j_t) \geq T \qquad \text{Equation 34}$$

PN synchronization is then declared detected in Correlation Cell t of even chip stream so even chip stream is sampled closer to the eye diagram opening and designated as the primary stream, and odd chip stream as the secondary stream for chip clock phase error detection in the tracking phase.

On the other hand, if $P_{max}$ satisfies $$P_{max}=Po(t,j_t) \geq T \qquad \text{Equation 35}$$

PN synchronization is then declared as having been detected in Correlation Cell t of odd chip stream and the odd chip stream is sampled closer to the eye diagram opening and designated as the primary stream, and even chip stream is designated as the secondary chip stream.

If $P_{max}$ satisfies both Equation 34 and Equation 35, this indicates that both chip streams are sampled half way from the eye diagram opening. In that case, one chip stream may be arbitrarily selected as the primary stream and the other as the secondary.

In some implementations, m may denote the frame time stamp of the correlation run of which PN synchronization is detected in Correlation Cell t with bin $j_t$ having the maximum peak bin power. Then PN code synchronization shift k and carrier frequency offset $\Delta f_s$ can be estimated as follows, where $R_s$, is the symbol rate:

$$k=m+t \qquad \text{Equation 36}$$

$$\Delta f_s = \begin{cases} \frac{j_t}{K}R_s, & \text{for } 0 \leq j_t < \frac{K}{2} \\ \left(\frac{j_t}{K}-1\right)R_s, & \text{for } \frac{K}{2} \leq j_t < K \end{cases} \qquad \text{Equation 37}$$

Once PN code sync is detected, PN Synchronization Detection Unit 42 outputs the primary/secondary stream indicator, PN synchronization shift k and carrier frequency offset $\Delta f_s$.

Figure 12:
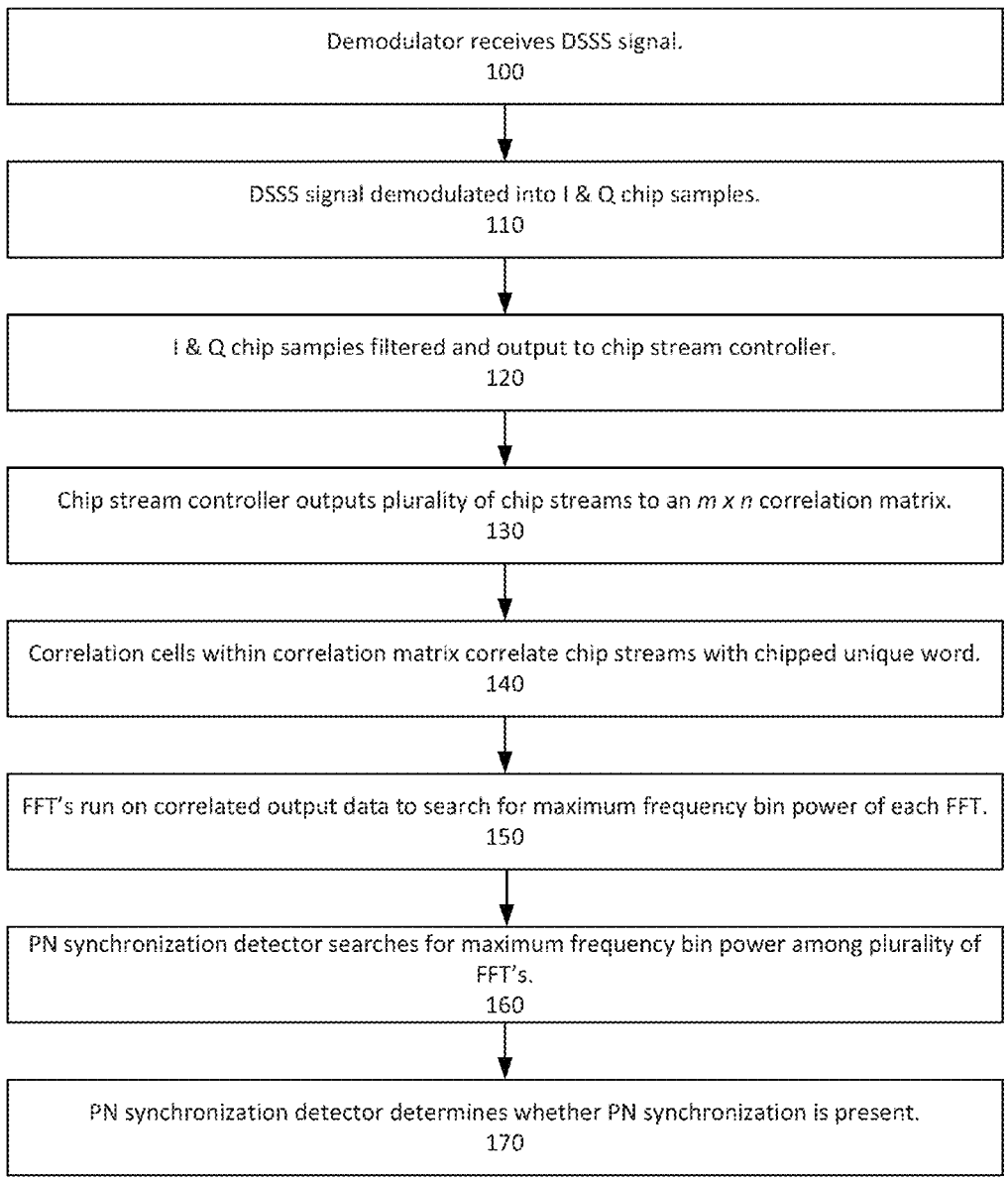
FIG. 12 is a block diagram of an implementation of a method of PN synchronization detection.

FIG. 12 depicts an implementation of a method for detecting PN synchronization for direct sequence spread spectrum (DSSS) signal in accordance with the above disclosure. As shown, a demodulator receives a DSSS signal which is comprised of a data stream having data frames of I and Q symbols 100. At least a portion of each data frame also comprises a unique word. The demodulator then demodulates the DSSS signal into I and Q chip samples 110 which are filtered and output to a chip stream controller 120. A plurality of chip streams, such as for example, even and odd chip streams, are output by the chip stream controller to an m×n correlation matrix, where m and n are comprised of integer values 130. There are m×n correlation cells within the correlation matrix which correlate the plurality of chip streams with the chipped unique word and output a correlated data stream 140.

A processor then runs a plurality of Fast Fourier Transforms (FFTs) on the correlated output data stream and searches for a maximum frequency bin power of each FFT 150. The maximum frequency bin power among all of the FFT runs is then found using a PN synchronization detector 160. Based upon this result, the PN synchronization detector makes a determination as to whether or not PN synchronization has been achieved 170.

Compared to conventional FIR methodology, implementations of the disclosed methods and systems are much less complex and much more flexible if the design needs to accommodate multiple spreading factors and UW lengths. Compared to conventional serial search methods, implementations of the disclosed methods and systems have comparable implementation economy, but can acquire PN synchronization much faster.

The core idea of implementations of the disclosed methods is to define the frame clock to time stamp each and every chip, and buffer chips so that the same set of chips can be searched multiple times for different possible PN sync shifts. The structure of m×n correlation matrix and n correlation cells per FFT engine allows an easy trade-off between acquisition time and available resources by selecting the proper m and n for a given resource constraint. It also allows easy porting of the same design to different platforms with different resource mix, substantially cutting development cost.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of detecting PN code synchronization for a direct sequence spread spectrum (DSSS) signal comprising:
   receiving, by a demodulator, a DSSS data signal comprising a data stream of data frames comprised of I and Q symbols, at least a portion of each data frame comprising a unique word;
   demodulating, by the demodulator, the data signal into I and Q chip samples;
   filtering, by a filter, the I and Q chip samples and outputting the filtered I and Q chip samples to a chip stream controller;
   outputting, by the chip stream controller, a plurality of chip streams to an m×n correlation matrix;
   correlating the plurality of chip streams with the chipped unique word using m×n correlation cells within the correlation matrix and outputting a correlated data stream;
   running a plurality of Fast Fourier Transforms (FFTs) on the correlated output data stream and searching for a frequency bin having a maximum frequency bin power of each FFT run using a processor;
   searching for a maximum frequency bin power among the plurality of FFT runs using a PN synchronization detector;
   determining, by the PN synchronization detector, whether PN synchronization is present; and
   determining an offset frequency and identifying a primary chip stream and a secondary chip stream.

2. The method of claim 1, wherein each chip stream among the plurality of chip streams is output to a separate m×n correlation matrix.

3. The method of claim 1, wherein the plurality of chip streams comprises an even chip stream and an odd chip stream.

4. The method of claim 1, further comprising time-stamping each of the I and Q chip samples using a frame clock.

5. The method of claim 4, further comprising receiving, by a chip buffer, a plurality of chips from the plurality of chip streams from the chip stream controller.

6. The method of claim 5, wherein the chip buffer continues receiving chips from the chip stream controller until the PN synchronization detector detects that PN synchronization is present.

7. The method of claim 2, further comprising simultaneously correlating the plurality of chip streams in parallel among the separate m×n correlation matrices.

8. The method of claim 1, further comprising sampling the primary chip stream closer to an eye diagram opening than the secondary chip stream is sampled.

9. The method of claim 1, further comprising sampling each chip stream among the plurality of chip streams at a midpoint between an eye diagram opening and an eye diagram closing.

10. The method of claim 6, further comprising outputting at least one of a primary and a secondary chip stream indicator, a PN synchronization shift value, and a carrier frequency offset in response to detecting that PN synchronization is present.

11. A system for detecting PN code synchronization for a direct sequence spread spectrum (DSSS) signal comprising:
a demodulator configured to:
receive a DSSS data signal comprising a data stream of data frames comprised of I and Q symbols, at least a portion of each data frame comprising a unique word; and
demodulate the data signal into I and Q chip samples;
a filter configured to filter the I and Q chip samples and outputting the filtered chipped I and Q symbol samples to a chip stream controller, the chip stream controller configured to output a plurality of chip streams to an m×n correlation matrix;
a processor configured to:
correlate the plurality of chip streams with the chipped unique word using m×n correlation cells within the correlation matrix and outputting a correlated data stream;
run a plurality of Fast Fourier Transforms (FFTs) on the correlated output data stream and searching for a frequency bin having a maximum frequency bin power of each FFT run; and
determine a carrier signal offset frequency and identify a primary chip stream and a secondary chip stream; and
a PN synchronization detector configured to:
search for a maximum frequency bin power among the plurality of FFT runs; and
determine whether PN synchronization is present.

12. The system of claim 11, wherein each chip stream among the plurality of chip streams is output to a separate m×n correlation matrix.

13. The system of claim 11, wherein the plurality of chip streams comprises an even chip stream and an odd chip stream.

14. The system of claim 11, further comprising a frame clock configured to time-stamp each of the I and Q chip samples.

15. The system of claim 14, further comprising a chip buffer configured to receive a plurality of chips from the plurality of chip streams from the chip stream controller.

16. The system of claim 15, wherein the chip buffer is further configured to continue receiving chips from the chip stream controller until the PN synchronization detector detects that PN synchronization is present.

17. The system of claim 12, wherein the processor is further configured to simultaneously correlate the plurality of chip streams in parallel among the separate m×n correlation matrices.

18. The system of claim 11, wherein the chip stream controller is further configured to sample the primary chip stream closer to an eye diagram opening than the secondary chip stream is sampled.

19. The system of claim 11, wherein the chip stream controller is further configured to sample each chip stream among the plurality of chip streams at a midpoint between an eye diagram opening and an eye diagram closing.

20. The system of claim 16, wherein the processor is further configured to output at least one of a primary and a secondary chip stream indicator, a PN synchronization shift value, and a carrier frequency offset in response to detecting that PN synchronization is present.

* * * * *